Patented July 31, 1934

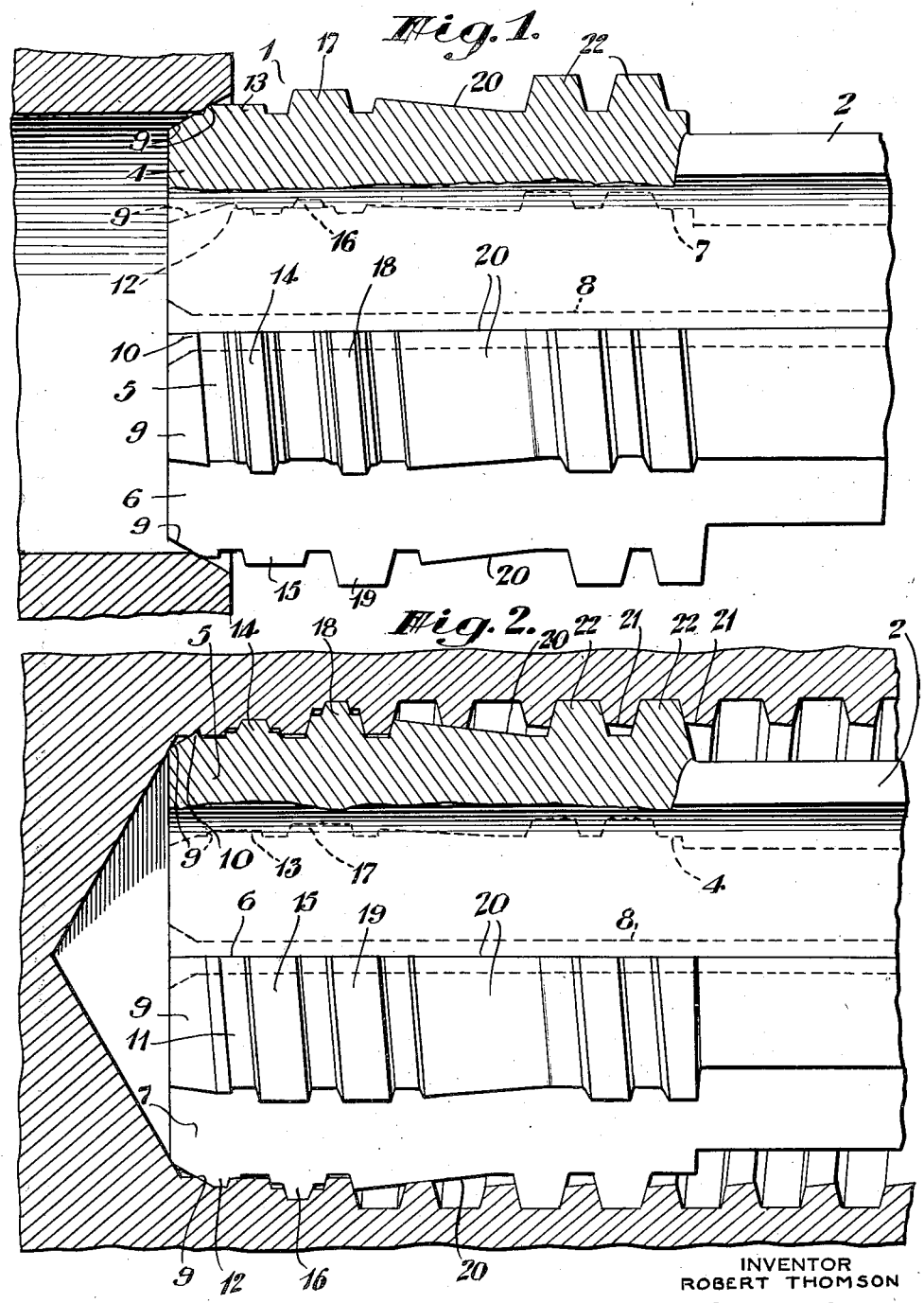

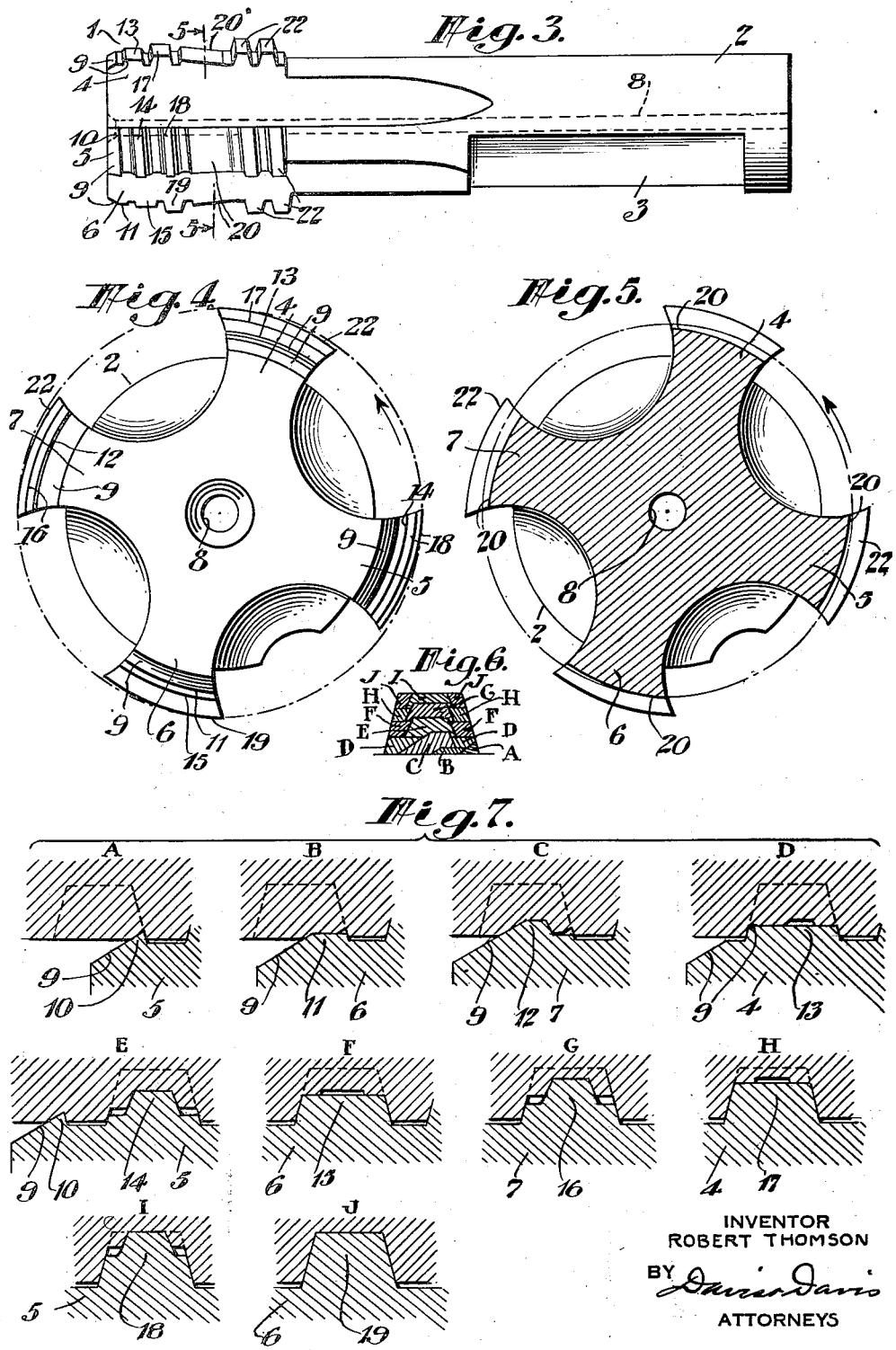

1,968,103

UNITED STATES PATENT OFFICE 1,968,103

TAP

Robert Thomson, Arlington, N. J., assignor to Dardelet Threadlock Corporation, New York, N. Y., a corporation of Delaware Application February 4, 1932, Serial No. 590,902

2 Claims. (Cl. 10—141)

Important objects of the present invention are, to provide an improved tap designed to develop an accurate screw thread within a few turns of the tap without injurious strain upon the tap and the work, and to provide such a tap, designed for cutting accurate Dardelet screw threads in bottomed holes.

Other objects of the invention will appear hereinafter.

In the drawings, Fig. 1 is a view partly in longitudinal section showing a tap for cutting Dardelet threads in initial, tap centering engagement with the entrance of a hole;

Fig. 2 a view similar to Fig. 1 showing the threading completed;

Fig. 3 a side elevation of the tap;

Fig. 4 an enlarged end view of the tap;

Fig. 5 a transverse section taken approximately on the line 5—5 of Fig. 3;

Fig. 6 a diagrammatic view indicating the chips taken in the development of a thread groove to full depth, the chips being lettered in the order in which they are taken; and Fig. 7 a group view showing the progressive development of the thread groove by the groove cutters of the tap.

The tap in the present form is designed for developing a Dardelet internal screw thread. Such a thread is designed for self-locking coaction with a complementary external thread and the complementary threads have grooves materially wider than their ribs to permit relative crosswise displacement of the threads. The internal thread has a crest surface slightly inclined with reference to the thread axis at an angle thereto within the angle of friction of the thread material, and the external thread has a similarly inclined root surface. The threads also have abrupt side faces to limit said crosswise displacement. Upon relative screwing movement of the threads without axial advance the threads are relatively displaced crosswise and said inclined root and crest surfaces are brought into self-locking frictional engagement. The tap is designed more particularly to accurately cut a Dardelet internal thread in a bottomed hole by a single operation and to fully develop the thread groove by only a few turns of the tap without injurious strain upon the tap.

The tap has a short threaded or working portion 1 and an integral reduced shank portion 2 which may be flatted along one side, as shown at 3, to hold the tap in a suitable driving socket or chuck. Working portion 1 is fluted longitudinally in the usual manner to provide four lands 4, 5, 6 and 7 carrying the interrupted tap thread rib. The number of lands may be varied, however. Centrally the tap may have a longitudinal bore 8 forming a duct for admission of oil through the tap to flush out the flutes during the operation of the tap. At the leading end of the tap the lands have a chamfer 9 of material depth for initial simultaneous engagement of the leading ends of all of the lands with the work, to accurately center the tap. The chamfer extends upward and rearward above the bottom of the tap thread groove and includes a portion of the groove-cutting profile of the initial thread on each land, as shown.

The interrupted tap thread rib comprises a helical series of groove-cutting teeth which are profiled for cutting action in a manner to prevent injurious strain upon the tap and the work. Said helical series includes a number of progressive groove center cutters and a number of progressive groove side cutters alternating with said center cutters along the series. Preceding said center and side cutters are several preliminary or leading groove cutters forming in effect part of the helical series. Following the series is a helical series of inclined thread crest cutters or trimmers, and following the crest cutters is a helical series of guide teeth profiled to correspond with the finished groove.

Upon the leading end of the tap land 5 there is a leading preliminary groove cutter or tooth 10 having a sharply peaked cutting profile including an inclined leading cutting edge lying within the chamfer 9 of said land, and a more abrupt inner side. Following the tooth 10 in the helical series is a second preliminary tooth 11 upon the land 6. Tooth 11 also has a cutting profile including an inclined leading cutting edge lying within the chamfer, a crest parallel to the tap axis, and an abrupt inner side. A tooth 12 upon the land 7 follows the tooth 11 and is the first groove center cutter of the helical series. It has a peaked cutting profile including an inclined leading cutting edge also lying within the chamfer, a short crest parallel with the tap axis, and an inner side which may be made abrupt but in the present instance is stepped to facilitate its manufacture. A tooth 13 upon the land 4 follows the tooth 12 and is the first full width groove side cutter of the helical series. Its cutting profile includes abrupt sides for developing the opposite sides of the groove for a portion of its depth, a straight crest parallel to the tap axis, and a chamfered forward corner lying within the chamber 9. The height of tooth 13 is less than that of the center cutter 12 preceding it. A second groove center cutter tooth 14, upon the land 5, follows the tooth 13 and its cutting profile includes abrupt sides and a centrally peaked crest. Following the tooth 14 is a groove side cutting tooth 15 upon the land 6, having abrupt sides, for developing the groove sides to a further depth, and a crest parallel to the tap axis. A groove center cutting tooth 16 upon the land 7 follows the tooth 15 and has a cutting profile similar to that of tooth 14 but of increased height. Upon the land 4 there is a groove side cutting tooth 17 having a cutting profile similar to that of tooth 15 but of increased height. A final groove center cutting tooth 18 upon the land 5 follows the tooth 17 and is similar to the preceding center cutters. It reaches the full bottom depth of the groove. A final groove side cutter 19 on the land 6 follows the cutter 18 and also reaches the full bottom depth of the groove. Tooth 19 completes the groove.

It will be seen that the groove side cutters are arranged in alternation with the groove center cutters in the helical series and that the peak of each center cutter is higher than the side cutter immediately following it in the series. A purpose of this alternation and relative proportioning of the side cutters and the center cutters is to produce a cutting action which will prevent injurious strain upon the tap and the work and prevent inaccurate thread cutting. Each center cutter takes only a narrow central chip and the side cutter following takes two narrow chips at opposite sides of the cut made by the preceding center cutter, as shown in Figs. 6 and 7. This widthwise division of the chips greatly relieves strain. When the chips are the full width of the groove, as is customary, they form a ribbon which curls upon itself and forms hard coils which choke the tap flutes and cannot be flushed out. Often these coils offer sufficient resistance to the rotation of the tap to break the tap in two and also mar the work. The alternating groove center cutters and groove side cutters take narrow chips which have less tendency to form into coils and will break more easily and can be easily flushed from the tap flutes.

The abrupt opposite sides of the tap rib converge slightly toward the top of the rig and the tap thread groove, along the series of groove cutters, is of uniform width and has a straight bottom cutting edge upon each land which is parallel to the tap axis. All of these bottom cutting edges upon each land lie upon a common base line parallel to the axis, and the groove base lines upon the four lands lie in the periphery of a cylinder. Each of the groove center cutters, with the exception of the first one, has a base portion corresponding to that of the groove side cutter preceding it in the series. The height of said base portion of each of these groove center cutting teeth is less than the height of the preceding side cutter to avoid cutting action at opposite sides of the central cutting peak. It will be obvious, however, that the base profile may be varied and still avoid said cutting action at opposite sides of the peak. In the present instance the peak crest and the shoulders at opposite sides thereof are parallel to the tap axis. The crest of each side cutter is also parallel to the axis. The trailing portions of all the teeth formed on the several lands are preferably relieved in the usual manner, as shown in Figs. 4 and 5.

The series of groove-cutting teeth described comprise about two and one-half turns of the thread rib of the tap thread. Immediately following said series is a helical series of crest cutters. For accommodating the latter two turns of the thread rib are omitted, thereby providing a wide groove bottom. In the present instance this bottom is inclined for the major portion of its width at an angle of six degrees. The depth of this inclined portion of the groove bottom is also progressively decreased on the successive lands. In the construction shown the wide groove is deepest on land 7, less deep on land 4, of still less depth on land 5, and of least depth on land 6. There are thus formed on the tap, immediately following the helical series of four groove-cutting teeth, a helical series of four successively acting, crest-trimming cutting edges or portions 20 for trimming down the crest of the flat-topped internal thread rib (developed by the action of the groove cutters) to slightly conoidal form, to form the conoidal rib-crest locking surface 21 of the well-known Dardelet self-locking internal screw thread, as shown in Fig. 2. The crest cutter 20 upon land 7 immediately follows the groove-finishing cutter 19 upon land 4 and is followed in the series by the crest cutters upon lands 4, 5 and 6 in the order named. The crest cutters are materially wider than the thread rib which they trim and they may be easily and accurately ground to the desired angle throughout the active intermediate portions of their width. The trailing portions of the crest cutters are preferably relieved, as shown in Fig. 5. Following the crest cutters the tap thread rib has several turns 22 which act as a guide screw and have no cutting action to perform, although they are effective to smooth the bottom and sides of the finished thread if necessary.

The decided chamfer of the leading end of the tap (extending above the tap grooves and including a portion of the cutting profile of the initial tooth on each land) accurately centers the tap in the chamfered entrance of a hole, and the initial groove cutters merge into the chamfer for gradual initial cutting action. Following the preliminary cutters the alternating groove center cutters and groove side cutters continue the gradual cutting action until the groove is fully developed. Then the following crest cutters trim the thread rib. The cutting action is distributed along the tap in a manner to prevent strain and ensure accurate development of the thread.

What I claim is:

1. A tap for cutting Dardelet screw threads having an interrupted thread groove cutting thread of constant minor diameter and a thread crest trimming cutter provided with a top cutting edge inclined to the thread axis longitudinally of said axis, between which cutter and the entering end of the tap said cutting thread winds about the tap with the path of the thread groove of the cutting thread crossing the said cutter, characterized in that said interrupted cutting thread has an unreduced cutting portion adjacent said cutter between which and the entering end of the tap there is a set of successive reduced cutting portions of the thread wherein cutting portions which are reduced at both sides of the thread adjacent their tops only and are also reduced in height relatively to each other in the order of their approach to the entering end of the tap alternate with cutting portions which are reduced only in height and which also decrease in height in the order of their approach to the entering end of the tap, each of which last-mentioned cutting portions is lower than the immediately preceding and following cutting portions and higher than their unreduced bases.

2. A tap, as claimed in claim 1, for cutting Dardelet screw threads, characterized in that said unreduced cutting portion of the thread, and each cutting portion of said set of reduced cutting portions of the thread, has a top cutting edge which extends longitudinally of and parallel to the thread axis.

ROBERT THOMSON.